(12) United States Patent
Roy et al.

(10) Patent No.: US 8,898,804 B2
(45) Date of Patent: Nov. 25, 2014

(54) SYSTEM AND METHOD FOR SELECTIVELY SHARING INFORMATION

(71) Applicant: Applied Research Works, Inc., Palo Alto, CA (US)

(72) Inventors: Shaibal Roy, Palo Alto, CA (US); Yin Ling Leung, Palo Alto, CA (US); Anandini Wadera, San Mateo, CA (US); Joyce Lignell, Honolulu, HI (US)

(73) Assignee: Applied Research Works, Inc., Palo Alto, CA (US)

( * ) Notice: Subject to any disclaimer, the term of this patent is extended or adjusted under 35 U.S.C. 154(b) by 0 days.

(21) Appl. No.: 13/686,729

(22) Filed: Nov. 27, 2012

(65) Prior Publication Data

US 2014/0150077 A1    May 29, 2014

(51) Int. Cl.
*H04L 29/06* (2006.01)
*H04L 29/08* (2006.01)
*H04L 12/58* (2006.01)

(52) U.S. Cl.
CPC .............. *H04L 67/22* (2013.01); *H04L 63/083* (2013.01); *H04L 51/32* (2013.01)
USPC .......................................................... 726/28

(58) Field of Classification Search
CPC ........ H04L 67/22; H04L 63/083; H04L 51/32
USPC .......................................................... 726/28
See application file for complete search history.

(56) References Cited

U.S. PATENT DOCUMENTS

| | | | |
|---|---|---|---|
| 5,517,405 A * | 5/1996 | McAndrew et al. ............. | 706/45 |
| 7,080,139 B1 * | 7/2006 | Briggs et al. .................. | 709/224 |
| 7,359,894 B1 | 4/2008 | Liebman et al. | |
| 7,680,770 B1 | 3/2010 | Buyukkokten et al. | |
| 7,716,140 B1 | 5/2010 | Nielsen et al. | |
| 7,945,482 B2 * | 5/2011 | Law et al. ..................... | 705/26.1 |
| 7,949,546 B1 * | 5/2011 | Klieman et al. .................. | 705/3 |
| 8,010,458 B2 | 8/2011 | Galbreath et al. | |
| 8,015,019 B1 | 9/2011 | Smith et al. | |
| 8,019,875 B1 | 9/2011 | Nielsen | |
| 8,095,381 B2 * | 1/2012 | Simons et al. ..................... | 705/2 |
| 8,219,500 B2 | 7/2012 | Galbreath et al. | |
| 8,279,061 B2 * | 10/2012 | Soliman ................... | 340/539.12 |
| 8,291,477 B2 | 10/2012 | Lunt | |
| 8,302,164 B2 | 10/2012 | Lunt | |
| 8,312,140 B2 | 11/2012 | Zuckerberg et al. | |
| 8,326,651 B2 * | 12/2012 | McLaren et al. .................. | 705/3 |
| 8,396,804 B1 * | 3/2013 | Dala et al. ....................... | 705/52 |
| 2002/0032582 A1 * | 3/2002 | Feeney et al. ..................... | 705/2 |
| 2005/0091316 A1 * | 4/2005 | Ponce et al. .................. | 709/205 |
| 2005/0171799 A1 | 8/2005 | Hull et al. | |
| 2005/0171832 A1 | 8/2005 | Hull et al. | |
| 2005/0171955 A1 | 8/2005 | Hull et al. | |
| 2005/0177385 A1 | 8/2005 | Hull et al. | |
| 2005/0245904 A1 * | 11/2005 | Estes et al. ................. | 604/890.1 |
| 2005/0251675 A1 * | 11/2005 | Marcjan et al. ............... | 713/100 |

(Continued)

*Primary Examiner* — David Garcia Cervetti
(74) *Attorney, Agent, or Firm* — Bryan E. Repetto

(57) ABSTRACT

Disclosed is a system and method for selectively sharing information among users of a computer application. Specific utility in healthcare applications is disclosed, but the scope of the invention is not limited to healthcare applications. The method involves selecting specific users, with whom information will be shared, a method for selecting such users' restrictions on the information that can be accessed by such users. Also disclosed is a system and method through which certain users can transmit communications on behalf of other users.

15 Claims, 6 Drawing Sheets

(56) References Cited

U.S. PATENT DOCUMENTS

| | | |
|---|---|---|
| 2006/0230061 A1 | 10/2006 | Sample et al. |
| 2006/0294134 A1 | 12/2006 | Berkhim et al. |
| 2007/0027931 A1* | 2/2007 | Heckenbach ............... 707/200 |
| 2007/0204308 A1* | 8/2007 | Nicholas et al. ............ 725/86 |
| 2008/0065974 A1* | 3/2008 | Campbell .................. 715/200 |
| 2008/0066080 A1* | 3/2008 | Campbell .................. 719/314 |
| 2008/0070593 A1* | 3/2008 | Altman et al. .............. 455/457 |
| 2008/0091834 A1 | 4/2008 | Norton |
| 2008/0104104 A1* | 5/2008 | Nolan et al. ................. 707/102 |
| 2008/0126476 A1* | 5/2008 | Nicholas et al. ............ 709/203 |
| 2008/0134294 A1* | 6/2008 | Mattox et al. .................. 726/4 |
| 2008/0243607 A1 | 10/2008 | Rohan et al. |
| 2009/0055263 A1* | 2/2009 | Okubo et al. ................. 705/14 |
| 2009/0055285 A1* | 2/2009 | Law et al. ..................... 705/26 |
| 2009/0146822 A1* | 6/2009 | Soliman .................. 340/573.1 |
| 2009/0177744 A1 | 7/2009 | Marlow et al. |
| 2009/0215469 A1* | 8/2009 | Fisher et al. ............. 455/456.3 |
| 2009/0234667 A1* | 9/2009 | Thayne ............................ 705/1 |
| 2009/0271370 A1 | 10/2009 | Jagadish et al. |
| 2009/0287066 A1* | 11/2009 | Meissner et al. ............ 600/300 |
| 2009/0319288 A1 | 12/2009 | Slaney et al. |
| 2009/0326967 A1 | 12/2009 | Kalaboukis |
| 2010/0004980 A1* | 1/2010 | Bowen .......................... 705/10 |
| 2010/0107219 A1* | 4/2010 | Thompson et al. .............. 726/2 |
| 2010/0169789 A1* | 7/2010 | Cheng et al. ................. 715/738 |
| 2010/0305970 A1* | 12/2010 | McLaren et al. ................ 705/3 |
| 2010/0305971 A1* | 12/2010 | McLaren et al. ................ 705/3 |
| 2010/0305972 A1* | 12/2010 | McLaren et al. ................ 705/3 |
| 2010/0305973 A1* | 12/2010 | McLaren et al. ................ 705/3 |
| 2010/0306858 A1* | 12/2010 | McLaren et al. ............... 726/28 |
| 2010/0325194 A1* | 12/2010 | Williamson et al. .......... 709/203 |
| 2011/0047487 A1* | 2/2011 | DeWeese et al. ............. 715/758 |
| 2011/0106911 A1* | 5/2011 | Sung et al. ................... 709/217 |
| 2011/0125527 A1* | 5/2011 | Nair ................................ 705/3 |
| 2011/0125528 A1* | 5/2011 | Padate et al. .................... 705/3 |
| 2011/0128281 A1* | 6/2011 | Bhogal et al. ................ 345/419 |
| 2011/0145105 A1* | 6/2011 | Law et al. ................... 705/27.1 |
| 2011/0185020 A1 | 7/2011 | Ramamurthy et al. |
| 2011/0191417 A1* | 8/2011 | Rathod ........................ 709/204 |
| 2011/0218868 A1* | 9/2011 | Young et al. .................... 705/16 |
| 2011/0238755 A1* | 9/2011 | Khan et al. ................... 709/204 |
| 2011/0246574 A1* | 10/2011 | Lento et al. .................. 709/204 |
| 2011/0276901 A1* | 11/2011 | Zambetti et al. .............. 715/753 |
| 2012/0005209 A1* | 1/2012 | Rinearson et al. ............ 707/737 |
| 2012/0005224 A1* | 1/2012 | Ahrens et al. ................ 707/769 |
| 2012/0084288 A1* | 4/2012 | Abdul-Razzak et al. ..... 707/737 |
| 2012/0109836 A1* | 5/2012 | Chen et al. .................... 705/319 |
| 2012/0110052 A1* | 5/2012 | Smarr et al. .................. 709/201 |
| 2012/0110064 A1* | 5/2012 | Chen et al. .................... 709/203 |
| 2012/0110076 A1* | 5/2012 | Su et al. ........................ 709/204 |
| 2012/0110088 A1* | 5/2012 | Su et al. ........................ 709/205 |
| 2012/0110096 A1* | 5/2012 | Smarr et al. .................. 709/206 |
| 2012/0110464 A1* | 5/2012 | Chen et al. .................... 715/738 |
| 2012/0110474 A1* | 5/2012 | Chen et al. .................... 715/753 |
| 2012/0116867 A1* | 5/2012 | Reis et al. .................. 705/14.41 |
| 2012/0116871 A1* | 5/2012 | Reis et al. .................. 705/14.49 |
| 2012/0122589 A1* | 5/2012 | Kelly et al. ...................... 463/42 |
| 2012/0150598 A1* | 6/2012 | Griggs ........................ 705/14.16 |
| 2012/0166267 A1* | 6/2012 | Beatty et al. ............... 705/14.21 |
| 2012/0166282 A1* | 6/2012 | Reis et al. .................. 705/14.55 |
| 2012/0166290 A1* | 6/2012 | Reis et al. .................. 705/14.66 |
| 2012/0166540 A1* | 6/2012 | Reis et al. .................... 709/204 |
| 2012/0173626 A1* | 7/2012 | Reis et al. .................... 709/204 |
| 2012/0173655 A1* | 7/2012 | McEntee ..................... 709/216 |
| 2012/0197980 A1* | 8/2012 | Terleski et al. ............... 709/203 |
| 2012/0203852 A1 | 8/2012 | Norton |
| 2012/0233557 A1* | 9/2012 | Wakhlu ........................ 715/753 |
| 2012/0239560 A1* | 9/2012 | Pourfallah et al. .............. 705/40 |
| 2012/0265758 A1* | 10/2012 | Han et al. ..................... 707/737 |
| 2012/0297038 A1* | 11/2012 | Mei et al. ..................... 709/223 |
| 2012/0311052 A1* | 12/2012 | Lee et al. ..................... 709/206 |
| 2013/0024516 A1* | 1/2013 | Blinder ........................ 709/204 |
| 2013/0046824 A1* | 2/2013 | Park et al. .................... 709/204 |
| 2013/0066962 A1* | 3/2013 | Scherzinger et al. ......... 709/204 |
| 2013/0066964 A1* | 3/2013 | Odio et al. .................... 709/204 |
| 2013/0073280 A1* | 3/2013 | O'Neil et al. ...................... 704/9 |
| 2013/0073568 A1* | 3/2013 | Federov et al. ............... 707/749 |
| 2013/0073632 A1* | 3/2013 | Fedorov et al. .............. 709/205 |
| 2013/0073979 A1* | 3/2013 | Shepherd et al. ............. 715/744 |
| 2013/0073983 A1* | 3/2013 | Rasmussen et al. .......... 715/753 |

* cited by examiner

| AUTHORIZATION LEVELS 17 | | | |
|---|---|---|---|
| VIEW BASIC INFORMATION | VIEW ALL BUT SENSITIVE INFORMATION | VIEW SENSITIVE INFORMATION | PROVIDE CONSENT |
| X | X | X | X |
| X | X | | |
| X | | | |

26 HIGH
25 MEDIUM
24 LOW

FIG. 5

SYSTEM AND METHOD FOR SELECTIVELY SHARING INFORMATION

BACKGROUND

In various computer applications, it is desirable to share information among numerous users. Although often times desirable, there are numerous instances in which it is necessary to share information only selectively. In healthcare, laws and regulations pertaining to privacy necessitate a means to share information among a carefully selected group of individuals. Even among those with whom information is shared, it is often times advantageous to share only certain, non-sensitive information with certain individuals. Due to privacy concerns, a system and method for selectively sharing information in industries such as healthcare is advantageous and necessary. In addition to healthcare, such a system and method would have utility in other applications such as social networking, financial transactions, and other applications where privacy is desirable.

BRIEF SUMMARY

Disclosed is a system and method for selectively sharing information. Certain embodiments have utility in social networking, business, computer, financial, and healthcare applications.

The disclosed system will detect and suggest those who should be added to a circle. A circle is a group of users who have access to a primary user's account information. Access by circle members may be restricted by varying access levels selected by the primary user.

The disclosed system will detect and suggest users to be added to a circle based on similarities in account data. In healthcare applications, a subscriber ID, supplied by a health insurance provider, has particular utility in locating close relatives.

Among primary users who are unable to have an account of their own, a primary contact may be designated. The primary contact will typically be a parent or guardian when the primary user is a child. Alternatively, the primary contact can be another user in the case of an incapacitated adult.

The disclosed system and method has particular utility in healthcare. Certain embodiments of the disclosed invention enable friends and relatives of a primary user to access a primary user's medical information. In some instances, the disclosed system will enable a member of a primary user's circle to consent to medical procedures on behalf of the primary user.

BRIEF DESCRIPTION OF THE DRAWINGS

FIG. 5 illustrates an embodiment of the various permissions afforded to members of a primary user's circle based on varying authorization levels.

DETAILED DESCRIPTION

Figure 1:
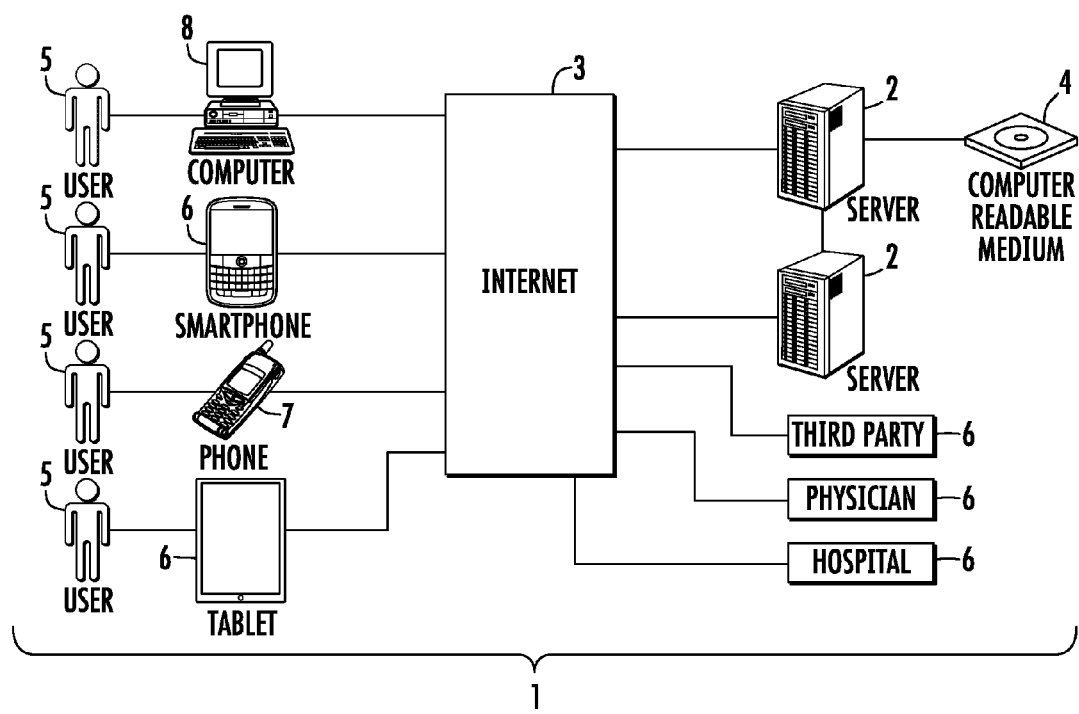
FIG. 1 illustrates an embodiment of a system, including third parties, wherein some third parties are healthcare providers.
Figure 2:
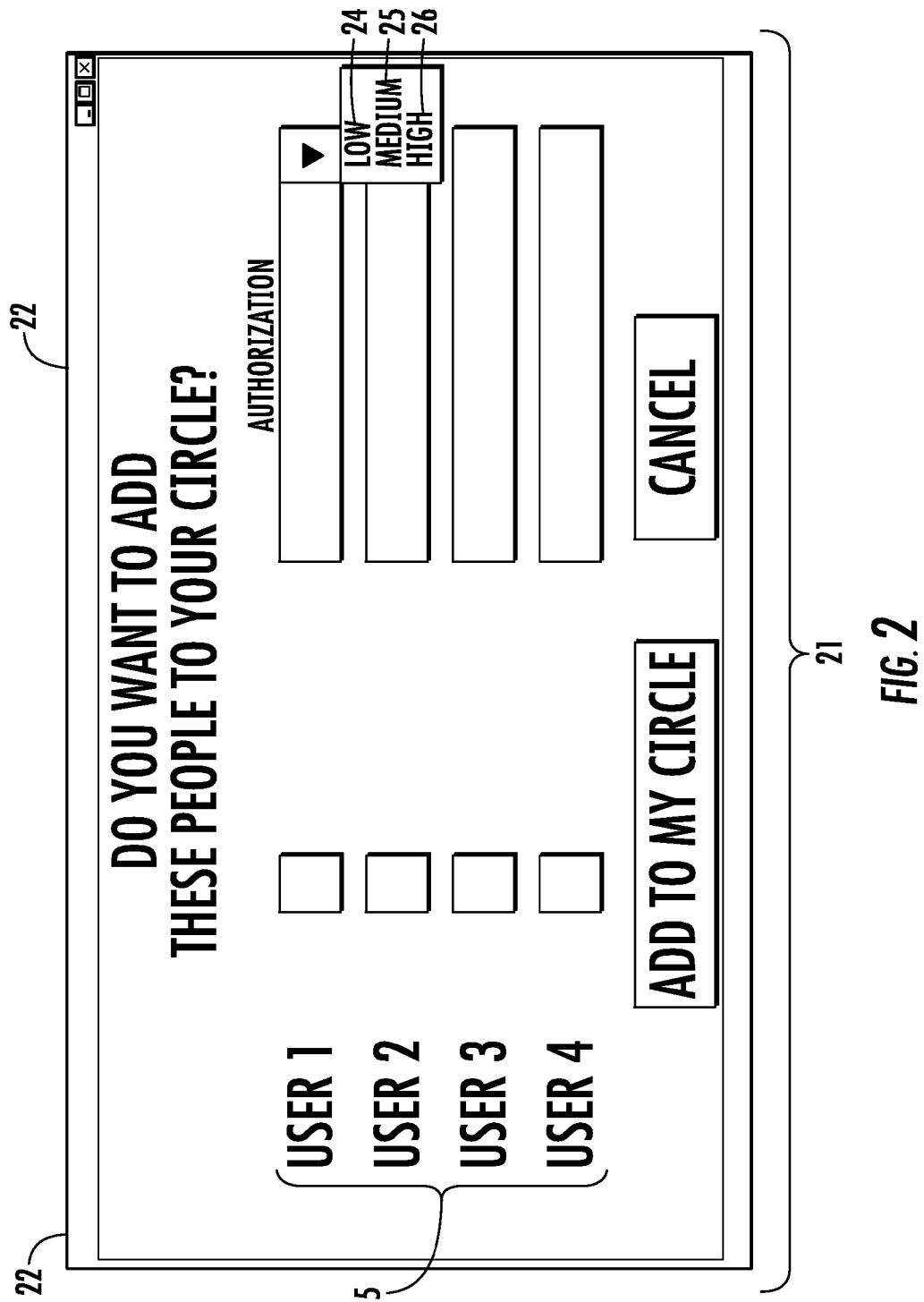
FIG. 2 illustrates an embodiment of a user interface wherein a primary user can select other users to become members of the primary user's circle.
Figure 3:
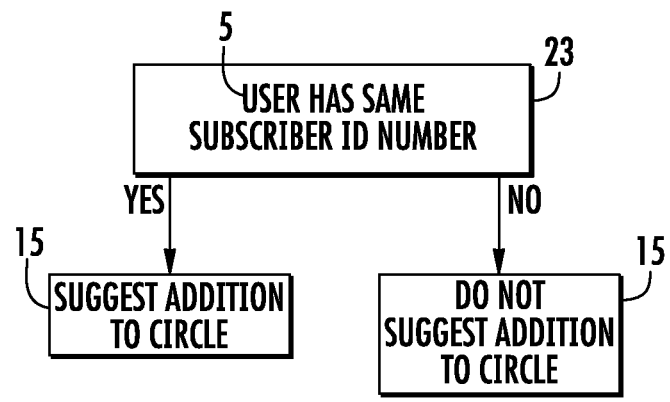
FIG. 3 illustrates an embodiment to determine whether a user should be suggested to a primary user as a member of the primary user's circle based on a common subscriber ID.
Figure 4:
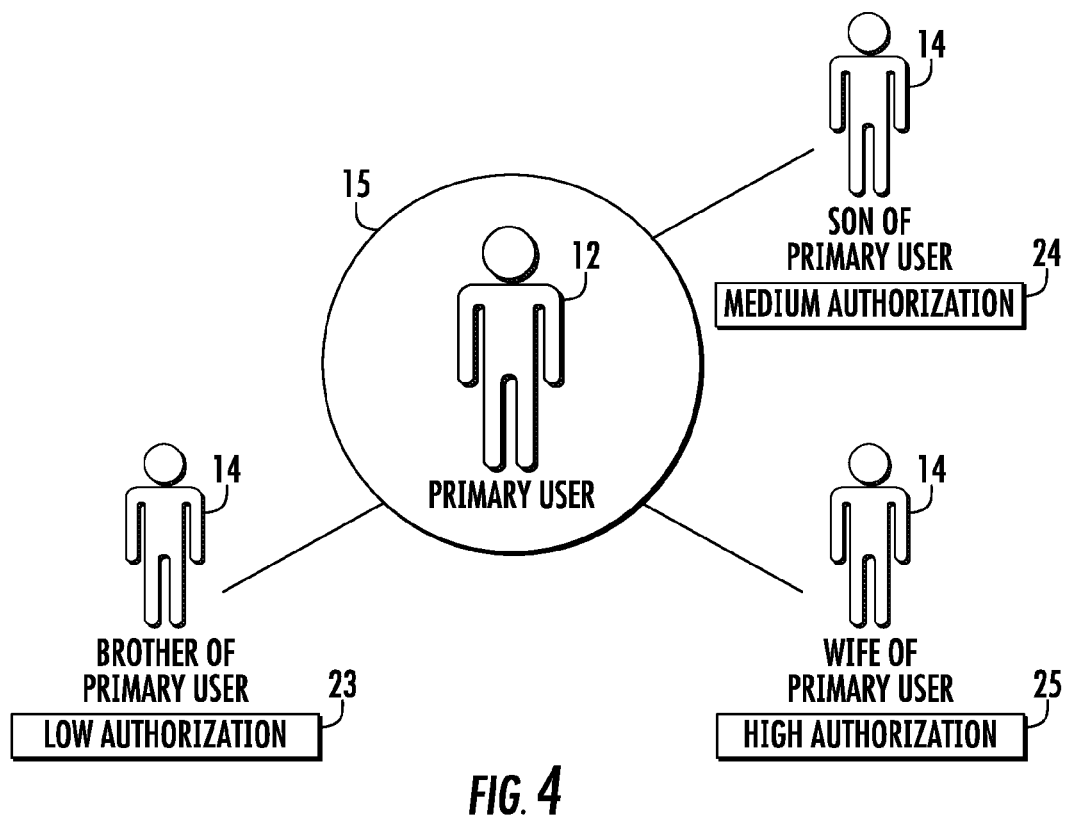
FIG. 4 illustrates an embodiment of a primary user's circle, wherein the primary user's son, wife, and brother are members of his circle, each member of the primary user's circle having differing authorization levels.
Figure 6:
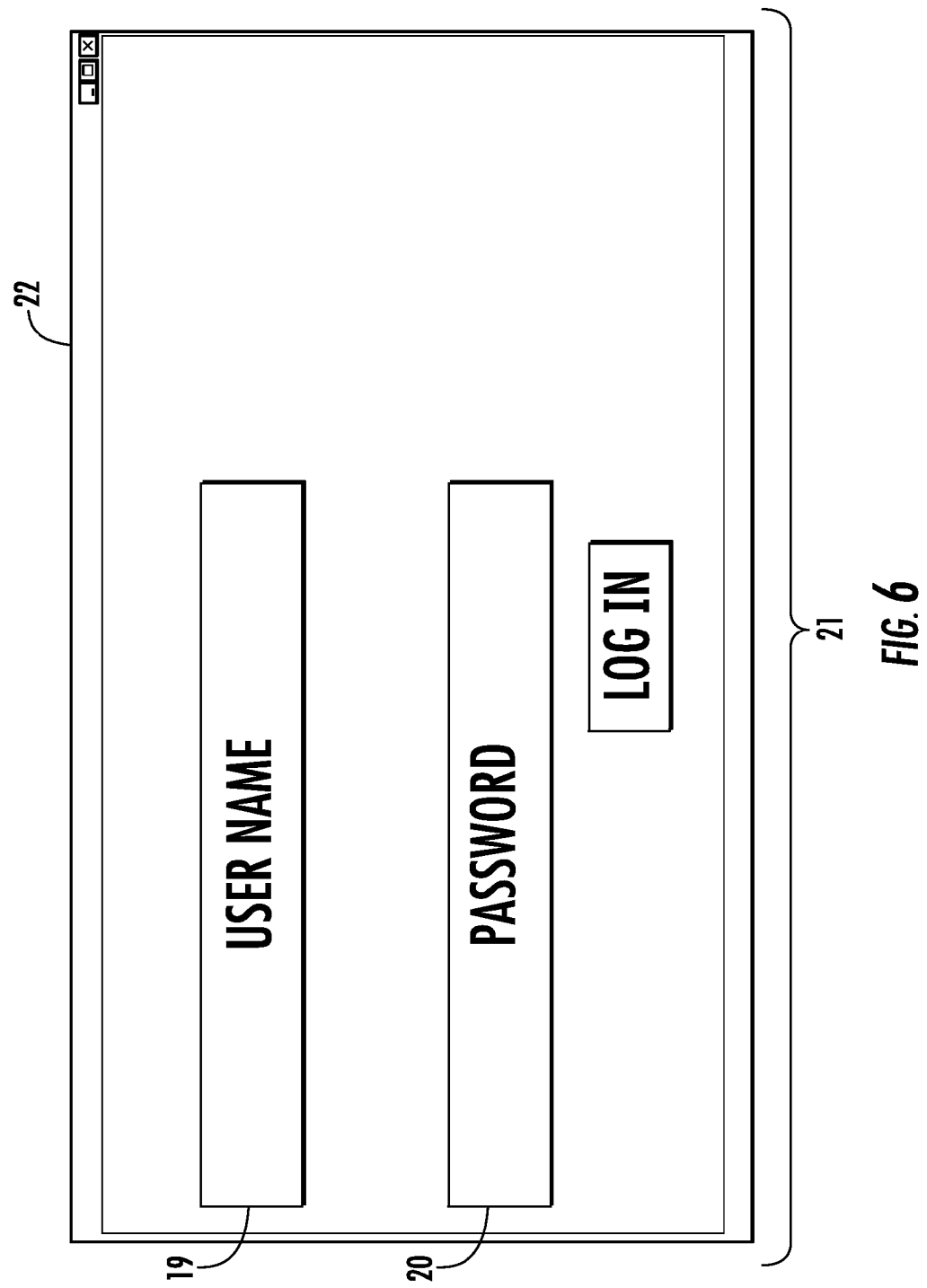
FIG. 6 illustrates an embodiment of a user interface through which a user's identity can be verified by providing a username and password.

Disclosed is a system 1 and method for selectively sharing information among users of an electronic service wherein the service is used for the storage, retrieval, and transmission of information. In certain embodiments, users share information over one or more internet based applications. The system comprises one or more servers 2, each server coupled to a network. In certain embodiments, one or more servers are coupled to the Internet 3. In certain embodiments, computer readable media 4 encoding instructions for carrying out various methods is coupled to one or more server 2. Users 5 connect to the system servers through various devices 6 having connections to the Internet 3. In alternative embodiments, users may access the system through local area networks, telephonic devices 7, radio frequencies, computers 8, or other electronic devices 9. In certain embodiments, third parties will use the system to store and retrieve information pertaining to users 5. In some embodiments, these third parties 10 may include healthcare providers 11, financial institutions, schools, and social networks.

In certain embodiments, information inputted into the system by third parties 10 will be accessible to users 5, primary users 12, and primary contacts 13. In addition, information inputted into the system 1 will also be accessible to members 14 of a circle 15 associated with an account 16, depending on the member's authorization level 17. In certain embodiments, the system 1 will automatically transmit information to users and members 14 of circles when information is uploaded. Transmission of information to members of circles is limited based on the authorization level held by a given member 14 of a circle 15.

Each user 5 has one or more accounts 16. Associated with each account 16 is various data. Each account has a primary user 12. The data contained on the account 16 pertains to the primary user 12. In healthcare applications, the data on the account may be a primary user's medical information.

Accounts 16 are accessible to users after identity 18 of the user 5 is established. In certain embodiments, users 5 establish their identity by providing a user name 19 and password 20. In alternative embodiments, users may establish their identity by providing other information such as a social security number, credit card number, name, date of birth, mailing address, email address, or a combination of any other information.

Primary users 12 may selectively share information associated with their accounts 16 with other users 5. Each account may be associated with a circle 15. A circle 15 is comprised of one or more other users 5 who are authorized to access information associated with the account 16. Information that may be shared includes information that may be found on social networking websites. Additionally, information of a sensitive nature may also be shared with others in a given circle 15. Medical and health information is of particular relevance.

In a healthcare application, a circle 15 may comprise relatives and close friends of a primary user. These other users 5 may assist the primary user 12 in obtaining proper medical care, reminding the primary user of physician office visits, and be reminded of times when prescription refills are needed. For example, and elderly man may include his two adult children in his circle. By including his adult children in his circle, his adult children will be able to view his medical history, and will be able to actively participate in his healthcare by knowing when his next medical appointments are scheduled, what drugs he is taking, what physicians he is seeing, and what preventative tests he needs. By selectively sharing information with those in a circle 15, medical information can be shared in a secure manner while complying with privacy standards, including the Health Insurance Portability and Accountability Act (HIPAA).

Selective sharing of information occurs when a primary contact 13, elects to allow another user to join his circle. The primary contact 13 may be the primary user 12. Alternatively, the primary contact may be a different user. A primary contact 13 in the circle 15 may be another user 5 when the account is for a child, or an adult who is unable to access information himself.

Through a user interface 21, which may be accessed through a web browser 22 or another software application, the primary contact 13 can add and remove other users 5 to a circle 15. In certain embodiments, the addition of an individual is not reciprocal. In such embodiments, the addition of a user 5 to the circle 15 of account 16 for which the primary contact 13 is acting, does not add the primary contact 13 or the primary user 12 to the circle 15 of the other user 5. In alternative embodiments, the addition of a user to a circle 15 is reciprocal. In such embodiments, an optional requirement is that both users 5 (or the primary contact of a user) agree to be added to each other's circle 15 before the addition will be complete and information will be shared. In certain embodiments, users 5 and primary contacts 13 may be free to add and remove users 5 from their circles at will. When a user is added to a circle 15, the system 1 will notify the user 5 that the user has been added to a circle 15. When a user is added to a circle 15, the user becomes a member of the primary user's circle 15.

When a member 14 of a circle 15 accesses his or her account 16 through a user interface 21, the member 14 is may access information about primary users 12 who have included the member 14 in their circles 15. Depending on authorization level 17, the circle member may then consent to procedures on behalf of primary users, or may communicate with third parties 10 on behalf of the primary user 2. In certain embodiments, a user interface 21 displays all primary users 12 who have accounts 16 that can be viewed by a circle member 14.

In some embodiments, third parties 10 may see who the primary contact 13 is for a given user 5. In healthcare settings, physicians and other healthcare providers may see who the primary contact 13 is for a given user 5. For example, a pediatrician will be able to see who the primary contact is for a child. In most instances, the primary contact 13 for a child will be a parent or guardian. In such embodiments, third parties 10 will also have access to information needed to contact the primary contact such as phone numbers, email addresses, and postal addresses. Certain embodiments also allow third parties, such as healthcare providers, to see others who are members of a given user's circle and the contact information of others in a given circle.

Suggestions are made to users 5 as to possible users 5 who may be desirable to include in a circle 15. Typical suggestions are other users 5 who likely have a close relationship with the primary user 12. In a certain embodiment, the system will prompt a user 5 to add another user to his or her circle 15. This can be done when a user 5 registers for an account 16, or anytime the system 1 detects a potential user meeting certain criteria. The system 1 seeks to prompt users 5 having similar characteristics. In certain embodiments, other users 5 having a common address, phone number, last name, credit card number, or combination thereof will cause the system to suggest a user to add other users having the same characteristics. In certain embodiments particularly applicable to healthcare, the system 1 will prompt a user 5 to add those having the same subscriber ID number 23 (identifying number from a health insurance provider) to the user's circle 15. Commonly, spouses and children will be covered under health plans that provider a single subscriber ID number 23 for all spouses, children, and dependents of the primary insured. In certain embodiments, the system will detect what circles 15 include a user, and prompt the user 5 to add other users 5 who list the user in their circles 15. In other embodiments, the system 1 will prompt users 5 to add those with known relationships to their circles 15. For example, if data stored in the system 1 indicates two users 5 are close relatives, married, or have indicated a close personal relationship exists; the system 1 will prompt users with known relationships to add each other to their circles 15. In certain embodiments in healthcare, this data can be obtained from medical records. In such embodiments, the system will prompt users to add, those who have been listed as emergency contacts, to their circles 15.

In healthcare, and certain other settings, children may have limited or no access to accounts for which they are the primary user 12. In certain embodiments, in cases where children are too young to manage an account independently, the system will automatically place a parent or guardian as the primary contact 13 for the child's account 16. In such embodiments, the child may be granted access to the account 16 when the child reaches a certain age. When the child reaches a specified age and is given full access, the parent, or other primary contact 13, will lose all access to the information contained on the child's account 16. The child may grant access back to a parent, or any other user 5, by adding the parent or other user to the child's circle 15.

Certain embodiments also consider privacy issues in the instance of a divorced couple with children. In such embodiments, when a child's account 16 already has an associated primary contact 13 (typically a parent), no other user 5 may obtain access to the information contained on the account without approval form the primary contact 13. Therefore, in such embodiments, children may be limited to a single primary contact 13 and information will only be shared with others upon approval of the primary contact. In other embodiments, if two subscriber ID numbers 23 are associated with a child's account, and each subscriber ID number 23 is also associated with one parent, each parent having a common subscriber ID number as a child will be able to access the child's account and will be in the child's circle.

When a user is added to a circle 15, the user is assigned an authorization level 17 based on the level of authorization the primary contact wishes to give the specific user. In certain embodiments, there are three levels of authorization levels 17: low 24, medium 25, and high 26. Users 5 in a circle 15 having low 24 authorization are only allowed to view non-sensitive information and are not allowed to make changes to account information or act on behalf of user associated with the account. In certain embodiments used in healthcare, users with low 24 authorization may only view basic information about the user associated with the account 16, and view very limited health information. Users in a circle having medium 25 authorization may view most information on the account 16, but may not make changes to the account information or act on behalf of the primary user. In certain embodiments used in healthcare, users with medium 25 authorization may view all health information except for highly sensitive information such as results of pregnancy tests and diagnoses of sexually transmitted infections. Users in a circle having high 26 authorization may view all information on an account and may make decisions on behalf of the user associated with the account 16. In certain embodiments used in healthcare, users with high authorization may access all medical records and may consent to administration of drugs and major surgery. In accounts where the primary contact is not the user associated with the account, the primary contact is granted high authorization. In some embodiments, the authorized level 17 of a member of a circle may be transmitted to third parties 10. In certain embodiments in healthcare applications, a list of users having high 26 authorization will be transmitted to healthcare providers, thereby enabling healthcare providers to obtain consent for certain procedures from a member of a circle having the appropriate level of authorization 17.

In certain embodiments, when a member 14 of a circle 15 attempts to access a primary user's 12 information, or attempts to act on behalf of a primary user 12, the system will verify the level of authorization of the member of the circle. Verification can be achieved by verifying the level of authorization 17 the primary user selected when adding the member of the circle to the circle.

Among members 14 of a circle 15, information regarding the primary user 12 will be shared with all members of a circle 15. In some embodiments, information will be shared among members of a circle according to their authorized level 17 of access. In such embodiments, those with low 24 access authorization will receive only limited information. In embodiments relating to healthcare, such information may be limited to the primary user's physicians. Those having medium 25 authorization will receive information regarding diagnoses and treatments. Those with high 26 authorization will receive all information relating to the primary user and may be contacted to give consent for certain procedures. Information may be transmitted to members 14 of a circle by email, postal mail, text messaging, or through communication through a user interface, interfacing with the system. Information transmitted to members of a circle 15 may include information pertaining to prescription refills, medical appointments, hospital admissions, diagnostic tests, diagnostic test results, and/or messages from healthcare providers. In some embodiments members 14 of a circle 15 may communicate with a third party 10 on behalf of the primary user 12. In some embodiments, the ability to communicate with a third party 10 may be limited to those having medium 25 authorizations or high 26 authorizations. In embodiments relating to healthcare, communications may be with healthcare providers. Such communication may occur through an interface provided to a member of a primary user's circle through the member's 14 own account 16. Such communication can be in the form of text, transmission of images, or drop-down menus and point-and-click features. Communication with a third party 10 can also grant consent on behalf of the primary user 12. This has particular utility in healthcare settings.

In some embodiments, those with high authorization may give consent and make requests on behalf of the primary user. In embodiments pertaining to healthcare, members of a circle holding high authorization may consent to procedures, request procedures be performed, rescind consent for procedures, order prescription refills, schedule physician visits, and other tasks typically performed by a primary user. It is understood, in such embodiments, that when a primary user gives another user high authorization, that the primary user is providing consent to the user given high authorization to act on behalf of the primary user.

While the invention has been described and illustrated with reference to certain particular embodiments thereof, those skilled in the art will appreciate that the various adaptations, changes, modifications, substitutions, deletions, or additions or procedures and protocols may be made without departing from the spirit and scope of the invention. It is intended, therefore, that the invention be defined by the scope of the claims that follow and that such claims be interpreted as broadly as reasonable.

What is claimed is:

1. A computerized method for selectively sharing information comprising the steps of:
    providing an account to a primary user through a computer network;
    providing an account to a second user through the computer network;
    obtaining permission from the primary user, to add the second user to a primary user's circle through the computer network;
    obtaining permission from the second user, through the computer network, to add the second user to the primary user's circle;
    adding the second user to the primary user's circle, thereby making the second user a member of the primary user's circle;
    receiving information about the primary user from third parties through the computer network; and
    providing information received from third parties to the member of the primary user's circle through the computer network.

2. The computerized method for selectively sharing information of claim 1 where in information is provided to the member of a primary user's circle through a user interface.

3. The computerized method for selectively sharing information of claim 2 further comprising the step of verifying the identity of the member of the primary user's circle.

4. The computerized method for selectively sharing information of claim 3 wherein the identity of the member of the primary user's circle is verified with a username and password combination.

5. The computerized method for selectively sharing information of claim 3 wherein access to the information obtained from third parties about the primary user is restricted by authorization level.

6. The computerized method for selectively sharing information of claim 5 further comprising the step of verifying an authorization level of a member of the primary user's circle.

7. The computerized method for selectively sharing information of claim 6 further comprising the steps of:
    verifying the authorization level of a member of the primary user's circle is high; and
    receiving consent for a medical procedure from the member of the primary user's circle through the computer network.

8. The computerized method for selectively sharing information of claim 1 where in information is provided to a member of a primary user's circle through an email message sent to the member of the primary user's circle.

9. A computerized method for selecting members of a primary user's circle comprising the steps of:
    suggesting, through a computer network, one or more second users who likely have a close relationship with a primary user as potential members of the primary user's circle based on the one or more second users satisfying one or more criteria, said one or more criteria selected from the group consisting of sharing a common address with the primary user, sharing a common phone number with the primary user, sharing a common last name with the primary user, sharing a common credit card number with the primary user, sharing a common subscriber ID number with the primary user, having a known relationship with the primary user, and the primary user already being a member of the one or more second users' circles;

obtaining approval from the primary user, through the computer network, to add the one or more second users who likely have a close relationships with the primary user to the primary user's circle; and obtaining approval from the one or more second users, through the computer network, to add the one or more second users to the primary user's circle.

10. The computerized method for selecting members of a primary user's circle of claim 9 further comprising the step of obtaining, through the computer network, an authorization level from the primary user for each user added to the primary user's circle.

11. A computerized method for a member of a primary user's circle to communicate on behalf of the primary user comprising the steps of:

providing an account to a primary user through a computer network;

providing an account to a second user through the computer network;

obtaining permission, through a computer network, from the primary user, to add the second user to a primary user's circle, thereby making the second user a member of the primary user's circle;

obtaining permission, through a computer network, from the second user, to add the second user to the primary user's circle;

receiving information about the primary user from third parties through the computer network;

obtaining, through the computer network, an authorization level, to be assigned to the second user from the primary user;

obtaining a consent or request from the second user, through the computer network, to transmit to a third party; and transmitting the consent or request to a third party through the computer network.

12. The computerized method for a member of a primary user's circle to communicate on behalf of the primary user of claim 11 further comprising the step of verifying the identity of the member of the primary user's circle.

13. The computerized method for a member of a primary user's circle to communicate on behalf of the primary user of claim 12 wherein the identity of the member of the primary user's circle is verified with a username and password combination obtained through the computer network.

14. The computerized method for a member of a primary user's circle to communicate on behalf of the primary user claim 13 wherein the consent or request obtained from the member of a primary user's circle on behalf of the primary user is consent for a medical procedure.

15. The computerized method for a member of a primary user's circle to communicate on behalf of the primary user claim 13 wherein the consent or request obtained from the member of a primary user's circle on behalf of the primary user is a request for a refill of a prescription.

* * * * *